United States Patent
Klein et al.

(10) Patent No.: US 11,687,733 B2
(45) Date of Patent: Jun. 27, 2023

(54) CONTRASTIVE SELF-SUPERVISED MACHINE LEARNING FOR COMMONSENSE REASONING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 16/912,319

(22) Filed: Jun. 25, 2020

(65) Prior Publication Data

US 2021/0406478 A1     Dec. 30, 2021

(51) Int. Cl.
  *G06F 40/40*  (2020.01)
  *G06N 3/088*  (2023.01)
  *G06N 3/045*  (2023.01)

(52) U.S. Cl.
  CPC ............. *G06F 40/40* (2020.01); *G06N 3/045* (2023.01); *G06N 3/088* (2013.01)

(58) Field of Classification Search
  CPC ...... G06F 40/40; G06F 40/211; G06F 40/284; G06N 3/0454; G06N 3/088; G06N 3/0427; G06N 20/00; G06N 3/08; G06N 5/04; G06K 9/6277
  See application file for complete search history.

(56) References Cited

U.S. PATENT DOCUMENTS

| | | | |
|---|---|---|---|
| 5,819,260 A * | 10/1998 | Lu | G06F 16/30 |
| | | | 707/999.005 |
| 8,935,152 B1 * | 1/2015 | Li | G06F 16/951 |
| | | | 704/7 |
| 10,733,380 B2 * | 8/2020 | Leidner | G06F 40/117 |
| 2002/0065857 A1 * | 5/2002 | Michalewicz | G06F 16/355 |
| | | | 715/234 |
| 2005/0108001 A1 * | 5/2005 | Aarskog | G06F 40/253 |
| | | | 704/10 |
| 2016/0293034 A1 * | 10/2016 | Agarwalla | G06N 20/00 |
| 2018/0052929 A1 * | 2/2018 | Liu | G06F 16/3347 |
| 2021/0097234 A1 * | 4/2021 | Sevenster | G06F 40/274 |
| 2021/0182935 A1 * | 6/2021 | Malkiel | G06F 16/3347 |
| 2021/0406478 A1 * | 12/2021 | Klein | G06F 40/40 |

OTHER PUBLICATIONS

"European Application Serial No. 21169044.1, Extended European Search Report dated Oct. 20, 2021", 10 pgs.

(Continued)

*Primary Examiner* — Michael N Opsasnick
(74) *Attorney, Agent, or Firm* — Schwegman Lundberg & Woessner, P.A.

(57) ABSTRACT

In an example embodiment, a self-supervised learning task is used for training commonsense-aware representations in a minimally supervised fashion and a pair level mutual-exclusive loss is used to enforce commonsense knowledge during representation learning. This helps to exploit the mutual-exclusive nature of the training samples of commonsense reasoning corpora. Given two pieces of input where the only difference between them are trigger pieces of data, it may be postulated that the pairwise pronoun disambiguation is mutually exclusive. This idea is formulated using a contrastive loss and then this is used to update the language model.

17 Claims, 6 Drawing Sheets

(56) References Cited

OTHER PUBLICATIONS

Klein, Tassilo, et al., "Contrastive Self-Supervised Learning for Commonsense Reasoning", arXiv: 2005.00669v1, (May 2, 2020), 7 pgs.

Storks, Shane, et al., "Commonsense Reasoning for Natural Language Understanding: A Survey of Benchmarks, Resources, and Approaches", arXiv: 1904.01172v1, (Apr. 2, 2019), 60 pgs.

* cited by examiner

CONTRASTIVE SELF-SUPERVISED MACHINE LEARNING FOR COMMONSENSE REASONING

TECHNICAL FIELD

This document generally relates to machine learning. More specifically, this document relates to contrastive self-supervised machine learning for commonsense reasoning.

BACKGROUND

Machine learning may be used in a variety of computerized tasks. Natural language processing (NLP) is a branch of machine learning that involves processing and analyzing natural language data, and is utilized in speech recognition, natural language understanding, and natural language generation. Natural language representation learning models such as Bidirectional Encoder Representations from Transformers (BERT) provide NLP implementations but still suffer from technical drawbacks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
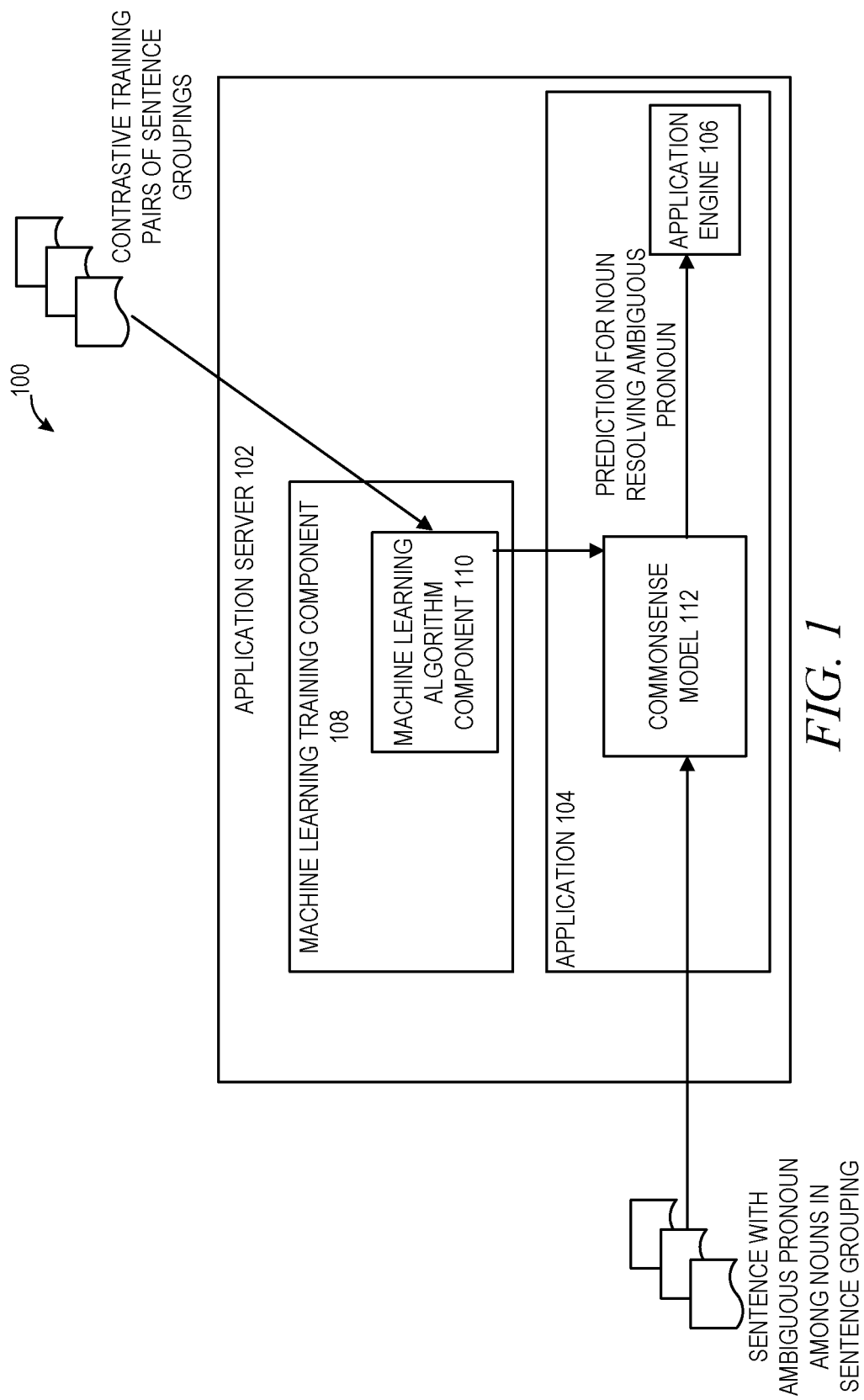
FIG. 1 is a block diagram illustrating a system for creating and utilizing a commonsense model in an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Despite recent progress in machine learning and natural language processing (NLP) specifically, current models suffer from a lack of commonsense reasoning. Among many factors, this can be attributed to the strong correlation of the attainable accuracy and the quantity and quality of training corpora.

For example, the meaning of pronouns is something that relies upon commonsense reasoning. For example, determining what "it" means in the sentences "the trophy doesn't fit in the suitcase because it is too small" and "the trophy doesn't fit in the suitcase because it is too big" can be difficult for NLP to resolve. For humans, it is straightforward based on the knowledge of what a trophy is and what a suitcase is, but a system without the capacity of commonsense reasoning is unable to conceptualize the inherent relationship and is therefore unable to distinguish "the suitcase" from the alternative option "the trophy."

One solution would be to utilize word embedding and language model technologies for commonsense reasoning. The underlying assumption would be that, since such models could be learned on large text corpora, such as online encyclopedias, they immediately capture to a certain degree common sense knowledge. As a result, these models would presumably permit reasoning about complex relationships between entities at inference time. These methods, however, make use of two-stage learning pipelines that are starting from an initial self-supervised model and commonsense-aware word embeddings are obtained in a subsequent fine-tuning phase. Fine-tuning enforces the learned embedding to solve the downstream tasks only as a plain co-reference resolution task.

However, solving this task makes use of more than just employing a language model learned from a large text corporate. Current self-supervised pretraining tasks, such as next sentence prediction and masked language models used in the word embedding phase are too "easy" (i.e., loose with their requirements) to enforce the model to capture commonsense. Consequently, the supervised fine-tuning stage is not sufficient nor adequate for learning to reason commonsense. This is particularly more severe when pretraining on commonsense-underrepresented corpora such as online encyclopedias, where the authors often skip incorporating such information in the text due to its assumed triviality.

In this case, the supervised fine-tuning is not enough to solve the task and can only learn to artificially resolve the pronoun based on superficial cues such as dataset and language biases.

In an example embodiment, minimal existing supervision is used for machine learning a commonsense-aware representation. For that, the concept of a self-supervised pretraining task is introduced, which only makes use of a pair of sentences that differ in as few as one word (namely, "trigger" words). No labels are used. The so-called trigger words are responsible for switching the correct answer choice between the questions. In the above example, the adjectives "big" and "small" act as such trigger words. As a result, candidate answer A is either right in the first sentence and wrong in the second, or vice-versa. As is evident from the example, trigger words give rise to the mutual-exclusive relationship of the training pairs.

The proposed approach targets to incorporate this pairwise relationship as the only supervisory signal during the training phase. In order to achieve this, the words are coupled in a contrastive sense. As a direct consequence, the classifier is enforced to be more rigorous in its decision as well as consistent across pairs, while being discriminative. Training in a contrastive self-supervised fashion allows for learning more in-depth word relationships that provide better generalization properties for commonsense reasoning.

In an example embodiment, a mutual exclusive (MEx) loss is incorporated during a representation learning phase by maximizing the mutual exclusive probability of the two plausible candidates. Specifically, given a pair of training sentences, the pronoun to be resolve is masked out from the sentence, and the language model is used to predict such that only one of the candidates can fill in the place of the masked pronoun while fulfilling the mutual-exclusivity condition. In this self-supervised task, the labels (i.e., correct candidates) do not need to be known a priori. This allows learning in an unsupervised manner by exploiting the fact that data is provided in a pairwise fashion.

Thus, in an example embodiment, a self-supervised learning task is used for training commonsense-aware representations in a minimally supervised fashion and a pair level mutual-exclusive loss is used to enforce commonsense knowledge during representation learning.

The goal of the proposed response is to exploit the mutual-exclusive nature of the training samples of common sense reasoning corpora. Given two sentences where the only difference between them is the trigger words, it may be postulated that the pairwise pronoun disambiguation is mutually exclusive. This idea is formulated using a contrastive loss and then this is used to update the language model. Thus, the proposed contrastive loss decomposes into two components:

$$\mathcal{L}(f_\theta) = \mathcal{L}(f_\theta)_{MEx} + \mathcal{L}(f_\theta)_{CM}$$

where f denotes the language model parameterized by θ.

The first term $\mathcal{L}_{MEx}$ enforces the mutual exclusivity of the answers across pairs. As such, it is a relaxation of the Exclusive-OR (XOR) operator with respect to candidates. He second term $\mathcal{L}_{CM}$ constitutes the contrastive margin. It enforces a margin between the candidate likelihoods from the language model. Whereas $\mathcal{L}_{MEx}$ operates across pairs, $\mathcal{L}_{CM}$ considers the candidates of each pair. Although both terms encourage the same property, which is mutual exclusivity of the answers, using both encourages stability. It should be noted that the proposed self-supervised approach does not make use of any class label information explicitly. Rather, it solely exploits the structural information of the data. In term the language model, in one example embodiment BERT may be leveraged for masked token prediction. This entails replacing the pronoun by a mask. As a result, the language model yields probabilities for the candidates of each sentence.

Given an associated pair of training sentences, i.e., $(s_j, s_j+1)$, where the difference between the sentence pairs are the two trigger words, let $c_i$ and $c_{i+1}$ be the two answer candidates for the masked pronoun resolution task. BERT for masked token prediction provides p $(c_i|s_j)$ and p $(c_{i+1}|s_j)$, i.e., the likelihood of the first and the second candidate being true in sentence $s_j$, respectively. It should be noted that if a candidate comprises several tokens, the number of input tokens to the model should be equal to the number of output tokens.

Since a candidate cannot be the right answer for both the first and the second sentence in the pair, a logical term that holds true for viable answers is yielded. It is worth noting that the logical expression is not unique, as multiple logical equivalents exist:

$$(c_{i,1} \oplus c_{i+1,1}) \wedge (c_{i,2} \oplus c_{i+1,2}) \wedge (c_{i,1} \oplus c_{i,2}),$$

where ⊕ denotes the XOR operator and $c_{i,j} \in \{0,1\}$ is the binary state variable corresponding to candidate $c_i$ in sentence $s_j$.

In order to be differentiable, the discrete logical term of the above equation is converted into a soft version. To this end, the binary variables are replaced with their corresponding probabilities. Similarly, the logical operators are replaced accordingly to accommodate for the probabilistic equivalent. With: a⊕b=(a∧¬b)∨(¬a∧b), a logical decomposition of the XOR operator, $\wedge_i^k x_i$ is replaced with the product $\Pi_i^k x_i$, $\vee_i^k x_i$ is replaced with the sum $\Sigma_i^k x_i$, and the not operation of the binary variable ¬$x_i$ is replaced with 1−$x_i$. Thus, transforming the logical terms of the above equation, the following soft loss component is yielded:

$$\mathcal{L}_{MEx} = -\sum_{i=i+2,}^{N} p_{i,1} p_{i+1,2}(1 - p_{i,2} p_{i+1,1}) + p_{i,2} p_{i+1,1}(1 - p_{i,1} p_{i+1,2}).$$

Here $p_{i,j} = p(c_i|s_j) \in [0,1]$ denotes the probability of candidate $c_i$ being the right answer in sentence $s_j$, and N corresponds to the number of training samples. Intuitively speaking, as no labels are provided to the model during training, the model seeks to make the answer probabilities less ambiguous, i.e. approximate binary constitution. As the model is forced to leverage the pairwise relationship in order to resolve the ambiguity, it needs to generalize w.r.t. commonsense relationships. As such, the task is inherently more challenging compared to e.g., supervised cross-entropy minimization.

In order to obtain stable optimization and speed up convergence, it is beneficial to augment the MEx loss with some form of regularization. To this end, a contrastive margin can be added. This seeks to maximize the difference between the individual candidate probabilities of the language model and is defined as:

$$\mathcal{L}_{CM} = \alpha \cdot \max(0, |p_{i,j} - p_{i,j+1}| + \beta),$$

with α, β being hyperparameters.

FIG. 1 is a block diagram illustrating a system 100 for creating and utilizing a commonsense model in an example embodiment. Here, an application server 102 runs an application 104 that might need the ability to resolve ambiguities in the meaning of pieces of input data. An example of such an application 104 might be a chatbot. A chatbot is an application that automatically responds to text input by a user with responses that mimic human responses. One issue that arises in chatbots is that it can be difficult to know the meaning of ambiguous terms in the text input by the user, and specifically the meaning of terms that could be resolved by human common sense but that may not be easily resolved by the typical chatbot functionality, which may be implemented in the application engine 106. The output of the application engine 106 in the chatbot embodiment may be a response to the user's text input, but that response can be difficult to form without having a prediction for the meaning of the ambiguous term. In an example embodiment, this ambiguous term is a pronoun in a sentence that is part of a sentence grouping (i.e., one or more sentences) having multiple nouns.

In an example embodiment, a machine learning training component 108 obtains contrastive training pairs of sentence groupings and feeds those constructive training pairs into a machine learning algorithm component 110. This machine learning algorithm component 110 runs the machine learning algorithm that was described in detail above, and results in a trained commonsense model 112 that is table to take an input sentence having an ambiguous term among a sentence grouping and output a prediction that resolves the ambiguity. In the pronoun embodiment, the ambiguous term is a pronoun that cannot be resolved among nouns in the sentence grouping.

It should be noted that while the above describes an example in terms of a chatbot. the commonsense model 112 can actually be implemented in any application that could benefit from a prediction that would resolve an ambiguous piece of data in input data, and thus the present application should not be interpreted as being limited to a chatbot implementation. Indeed, the application engine 106 may utilize the prediction in a variety of different ways, depending on the goals and implementation of the application 104.

Figure 2:
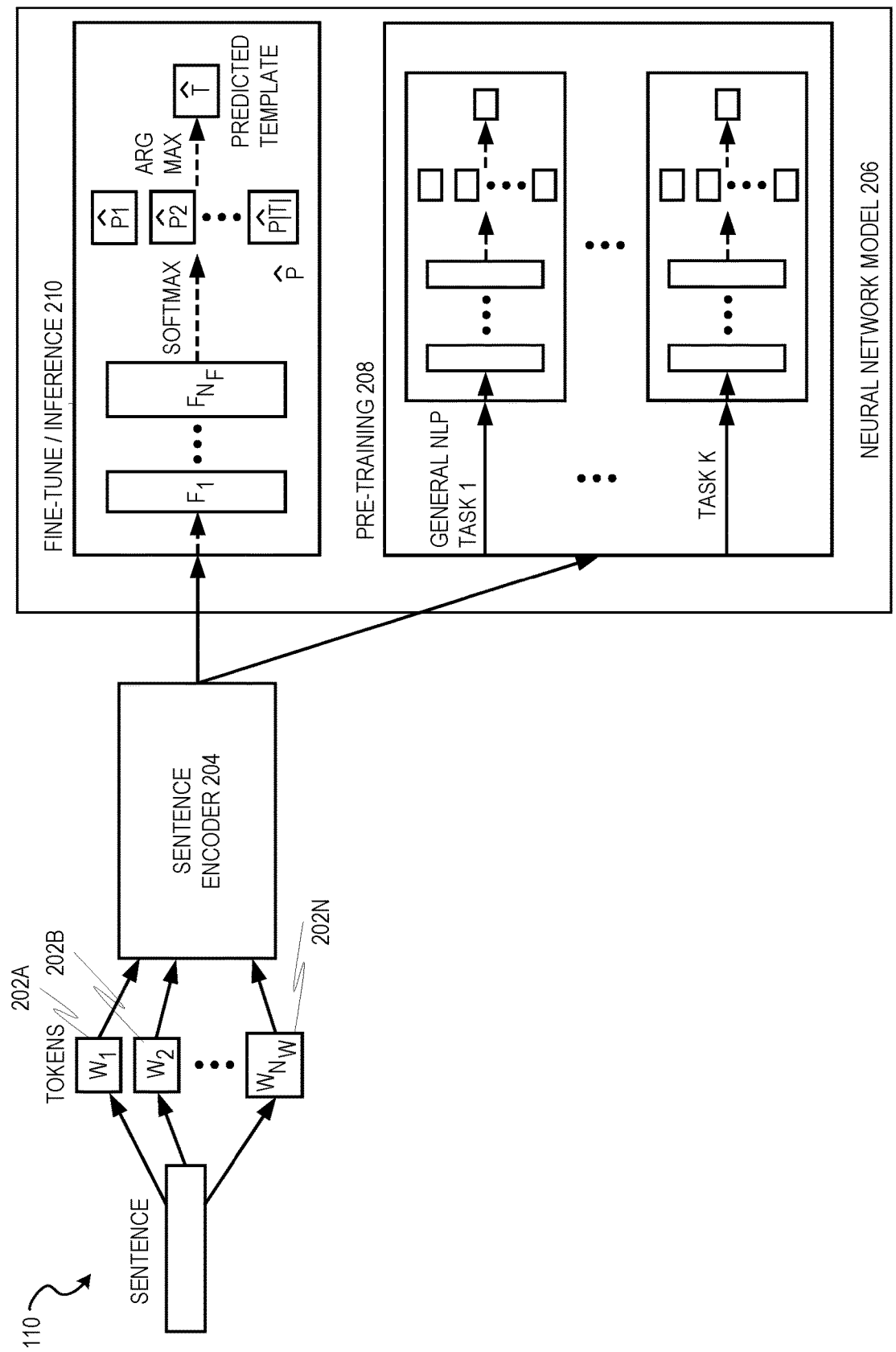
FIG. 2 is a block diagram illustrating the machine learning algorithm component in more detail in accordance with an example embodiment.

In one example embodiment, the machine learning algorithm component 110 implements a neural network having a sentence encoder, with the neural network programmed with a mutual exclusive loss function. FIG. 2 is a block diagram illustrating the machine learning algorithm component 110 in more detail in accordance with an example embodiment. Each sentence (or sentence grouping) in the training pairs is split into a series of tokens 202A-202N and the tokens 202A-202N are passed to a sentence encoder 204, which utilizes a neural network model 206. In an example embodiment, the sentence encoder is first pre-trained 208 with general tasks, and then the sentence encoder 204 is fine-tuned 210 with a multilayer perceptron network (MLP) using the template classification data.

Figure 3:
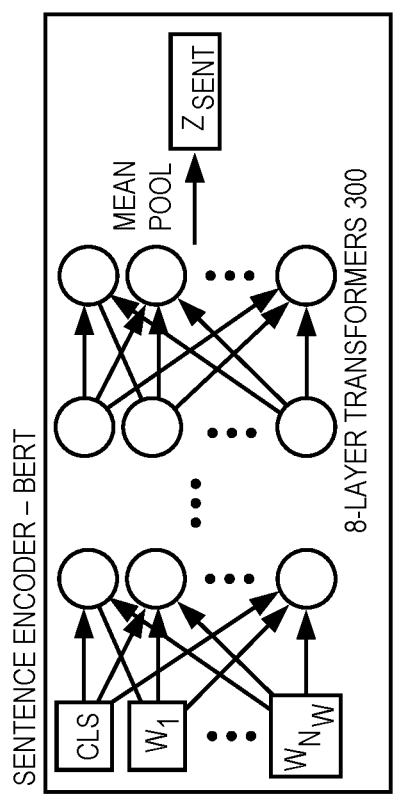
FIG. 3 is a block diagram illustrating BERT in accordance with an example embodiment.

In an example embodiment, Bidirectional Transformers (BERT) are used to encode sentences into embeddings in the sentence encoder 204. It should be noted that BERT is merely used in some example embodiments, and in others another language model can be used in lieu of BERT. FIG. 3 is a block diagram illustrating BERT in accordance with an example embodiment. BERT uses transformer layer(s) 300 to encode the input sentence to embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

$$MultiAttn(h^{n-1}) = concat(head_1(h^{n-1}), \ldots, head_k(h^{n-1}))W^O,$$

$$head_i(h^{n-1}) = \text{softmax}\left(\frac{(h^{n-1}W_q^i)(h^{n-1}W_k^i)}{\sqrt{d_k}}\right)(h^{n-1}W_v^i).$$

where $h^{n-1}$ is the output of the previous Transformer layer. Here, a BERT model with 8 Transformer layers is used, and the output sentence embedding $z_{sent}$ is defined as the mean-pooling result of the last transformer layer's output. For simplicity, batch normalization and residual connections are omitted in the equations.

Referring back to FIG. 2, after the sentence embedding $z_{sent}$ is obtained, it is passed through a fine-tune/inference component 210, which implements a MLP, wherein each fully-connected layer is defined as $$f(x)=relu(xW+b),$$

and the last layer of the MLP is defined as $$\hat{P}=\text{softmax}(f(x)W+b),$$

where the output $\hat{P}$ is the categorical probability distribution of each class. Finally, the most probable class arg max($\hat{P}$) is picked as the final predicted template label. To train the model, a binary-cross entropy loss can be used:

$$\mathcal{L}(P, \hat{P}) = -\sum_i p^i \log \hat{p}^i,$$

where P is the ground truth, $p^i$ and $\hat{p}^i$ are the ground truth and predicted probability of $i^{th}$ template respectively. An Adam optimizer (adaptive learning rate optimization algorithm) may be used to optimize the model parameters.

Figure 4:
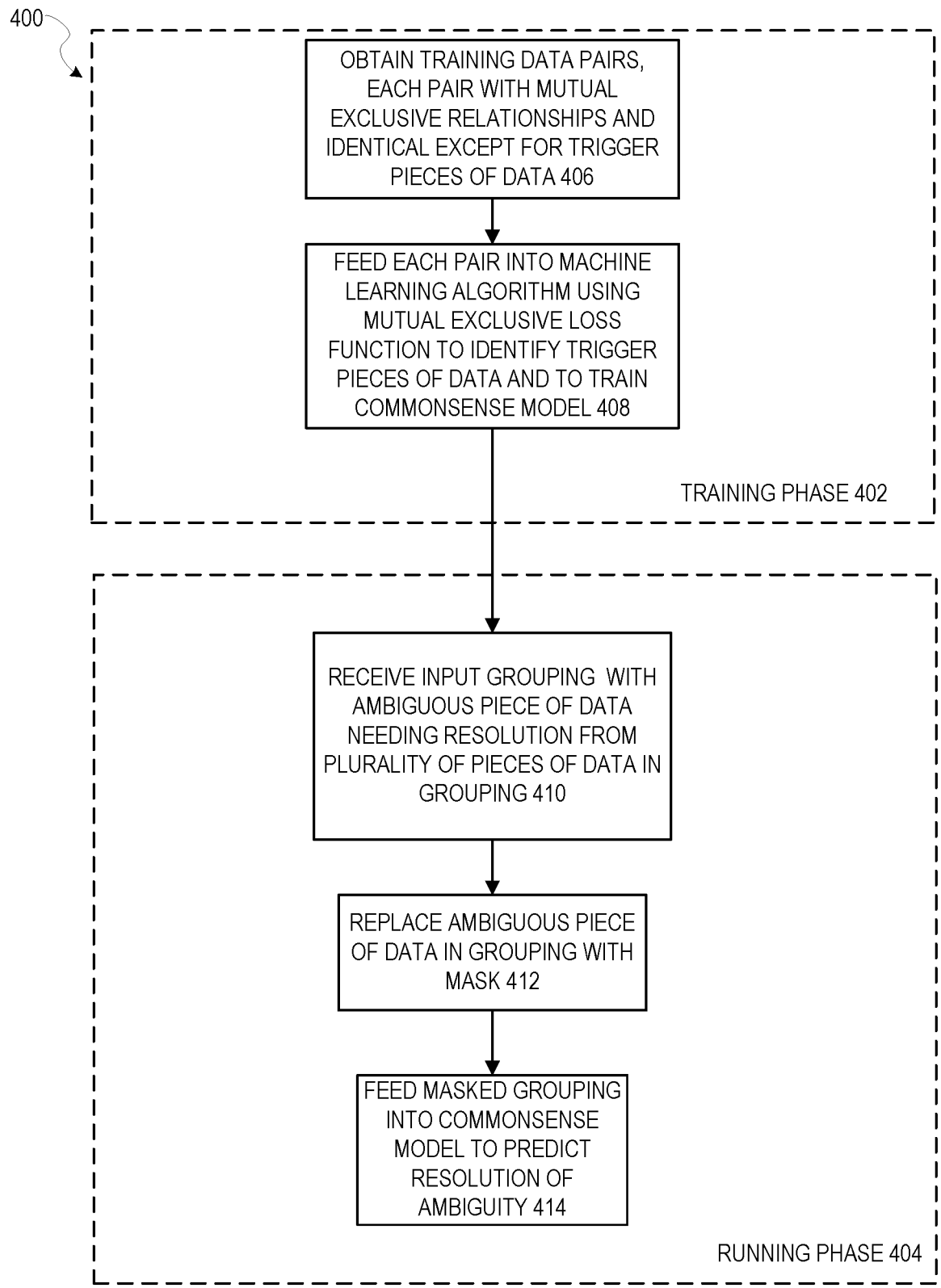
FIG. 4 is a flow diagram illustrating a method of predicting a resolution of an ambiguous piece of data from a plurality of pieces of data in an input.

FIG. 4 is a flow diagram illustrating a method 400 of predicting a resolution of an ambiguous piece of data from a plurality of pieces of data in an input. By resolution, it is meant that the prediction selects one of the plurality of pieces of data in the input as representative of the meaning of the ambiguous piece of data. It should be noted that while this may be easiest to think about in the terms of an ambiguous pronoun in a grouping of one or more sentences (where one of a plurality of nouns in the grouping should be the predicted resolution), there may be other types of ambiguous pieces of data that the above-described methods and processes can be applied to. For example, there may be other ambiguous forms of speech in text other than just pronouns. There may also be ambiguous elements of images that may be resolved from other portions of images. Nevertheless, for ease of discussion when applicable the pronoun embodiment has been and will be described.

The method 400 may be broken out into two phases: a training phase 402 and a running phase 404. During the training phase 402, a commonsense model will be trained to provide a prediction of a resolution of an ambiguous piece of data from a plurality of pieces of data in an input. During the running phase 404, the commonsense model is used to make such a prediction on a specific input.

Beginning with the training phase 402, at operation 406, training data pairs are obtained. Each of these training data pairs reflect two groupings of data, such as two sentence groupings, that have mutual exclusive relationships and are identical except for trigger pieces of data. In the pronoun embodiment, each sentence grouping may be one or more sentences and the trigger pieces of data are trigger words, meaning that the pairs of sentence groupings are identical except for the change in the trigger words. It should be noted that "identical" means not only that the same words (except for trigger words) and punctuation appear in each sentence grouping, but that they are organized in the same order in each sentence grouping (so, for example, none of the words in the second sentence are rearranged from their positions in the first sentence).

At operation 408, each pair of the training data pairs is fed into a machine learning algorithm having a mutual exclusive loss function, which identifies the trigger pieces of data in each pair and trains the commonsense model.

At this point, the commonsense model is trained and can be used in the running phase 404. At operation 410, an input grouping with an ambiguous piece of data needing resolution from a plurality of pieces of data in the grouping is received. In the pronoun embodiment, the grouping is a sentence grouping of one or more sentences, the ambiguous piece of data is a pronoun and the plurality of pieces of data are nouns in the sentence grouping. At operation 412, the ambiguous piece of data in the grouping is replaced with a mask. At operation 414, the masked grouping is fed into the commonsense model to predict the resolution of the ambiguity.

Examples

Example 1. A system comprising:
  at least one hardware processor; and
  a non-transitory computer-readable medium storing instructions that, when executed by the at least one hardware processor, cause the at least one hardware processor to perform operations comprising:

obtaining training data pairs, each training data pair being a pair of groupings of data having mutual exclusive relationships and identical to each other except for trigger pieces of data; and feeding each of the training data pairs into a machine learning algorithm using a mutual exclusive loss function to train a commonsense machine learned model.

Example 2. The system of claim Example 1, wherein the operations further comprise:

receiving an input grouping of data having an ambiguous piece of data needing resolution from a plurality of pieces of data in the input grouping of data;

replacing the ambiguous piece of data in the input grouping with a mask; and feeding the masked input grouping into the commonsense machine learned model to output a prediction of a resolution of the ambiguous piece of data.

Example 3. The system of Example 2, wherein each grouping of data is a grouping of text sentences.

Example 4. The system of Examples 2 or 3, wherein the ambiguous piece of data is a pronoun and the plurality of pieces of data from which the pronoun needs to be resolved are nouns in the grouping of text sentences.

Example 5. The system of any of Examples 1-4, wherein the machine learning algorithm is a neural network.

Example 6. The system of Example 5, wherein the neural network utilizes a Bidirectional Encoder Representations from Transformers (BERT) sentence encoder.

Example 7. The system of any of claims 2-6, further including a chatbot, wherein the chatbot includes a model trained to take the input grouping of data and the prediction of the resolution of the ambiguous piece of data from the commonsense machine learned model and output a text output to a user responsive to the input grouping of data.

Example 8. A method comprising:

obtaining training data pairs, each training data pair being a pair of groupings of data having mutual exclusive relationships and identical to each other except for trigger pieces of data; and feeding each of the training data pairs into a machine learning algorithm using a mutual exclusive loss function to train a commonsense machine learned model.

Example 9. The method of Example 8, wherein the operations further comprise:

receiving an input grouping of data having an ambiguous piece of data needing resolution from a plurality of pieces of data in the input grouping of data;

replacing the ambiguous piece of data in the input grouping with a mask; and feeding the masked input grouping into the commonsense machine learned model to output a prediction of a resolution of the ambiguous piece of data.

Example 10. The method of Example 9, wherein each grouping of data is a grouping of text sentences.

Example 11. The method of any of Examples 9 or 10, wherein the ambiguous piece of data is a pronoun and the plurality of pieces of data from which the pronoun needs to be resolved are nouns in the grouping of text sentences.

Example 12. The method of any of Examples 8-11, wherein the machine learning algorithm is a neural network.

Example 13. The method of Example 12, wherein the neural network utilizes a Bidirectional Encoder Representations from Transformers (BERT) sentence encoder.

Example 14. The method of any of Examples 9-13, further including a chatbot, wherein the chatbot includes a model trained to take the input grouping of data and the prediction of the resolution of the ambiguous piece of data from the commonsense machine learned model and output a text output to a user responsive to the input grouping of data.

Example 15. A non-transitory machine-readable medium storing instructions which, when executed by one or more processors, cause the one or more processors to perform operations comprising:

obtaining training data pairs, each training data pair being a pair of groupings of data having mutual exclusive relationships and identical to each other except for trigger pieces of data; and feeding each of the training data pairs into a machine learning algorithm using a mutual exclusive loss function to train a commonsense machine learned model.

Example 16. The non-transitory machine-readable medium of Example 15, wherein the operations further comprise:

receiving an input grouping of data having an ambiguous piece of data needing resolution from a plurality of pieces of data in the input grouping of data;

replacing the ambiguous piece of data in the input grouping with a mask; and feeding the masked input grouping into the commonsense machine learned model to output a prediction of a resolution of the ambiguous piece of data.

Example 17. The non-transitory machine-readable medium of Example 16, wherein each grouping of data is a grouping of text sentences.

Example 18. The non-transitory machine-readable medium of Examples 15 or 16, wherein the ambiguous piece of data is a pronoun and the plurality of pieces of data from which the pronoun needs to be resolved are nouns in the grouping of text sentences.

Example 19. The non-transitory machine-readable medium of any of Examples claim 15-18, wherein the machine learning algorithm is a neural network.

Example 20. The non-transitory machine-readable medium of Example 19, wherein the neural network utilizes a Bidirectional Encoder Representations from Transformers (BERT) sentence encoder.

Figure 5:
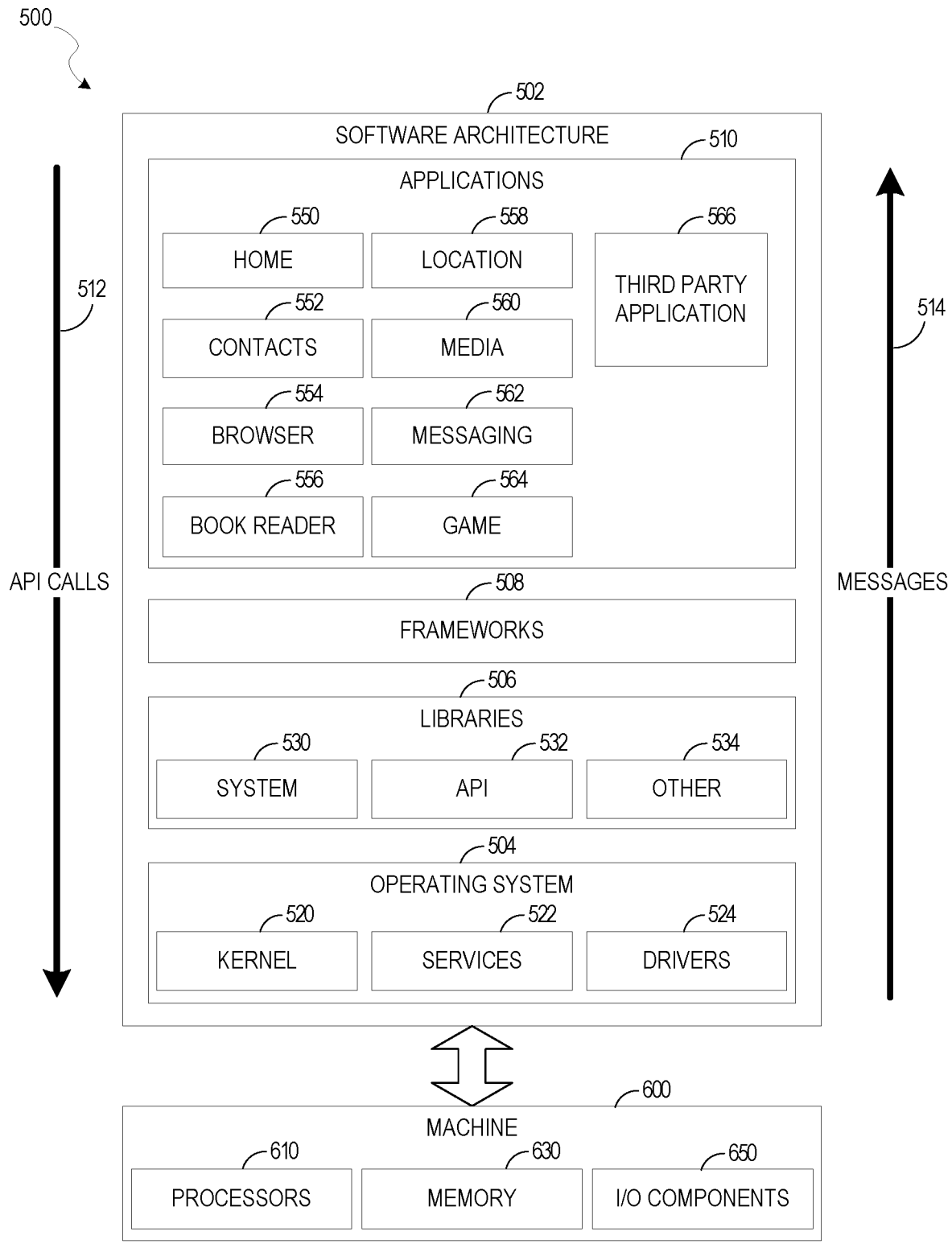
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
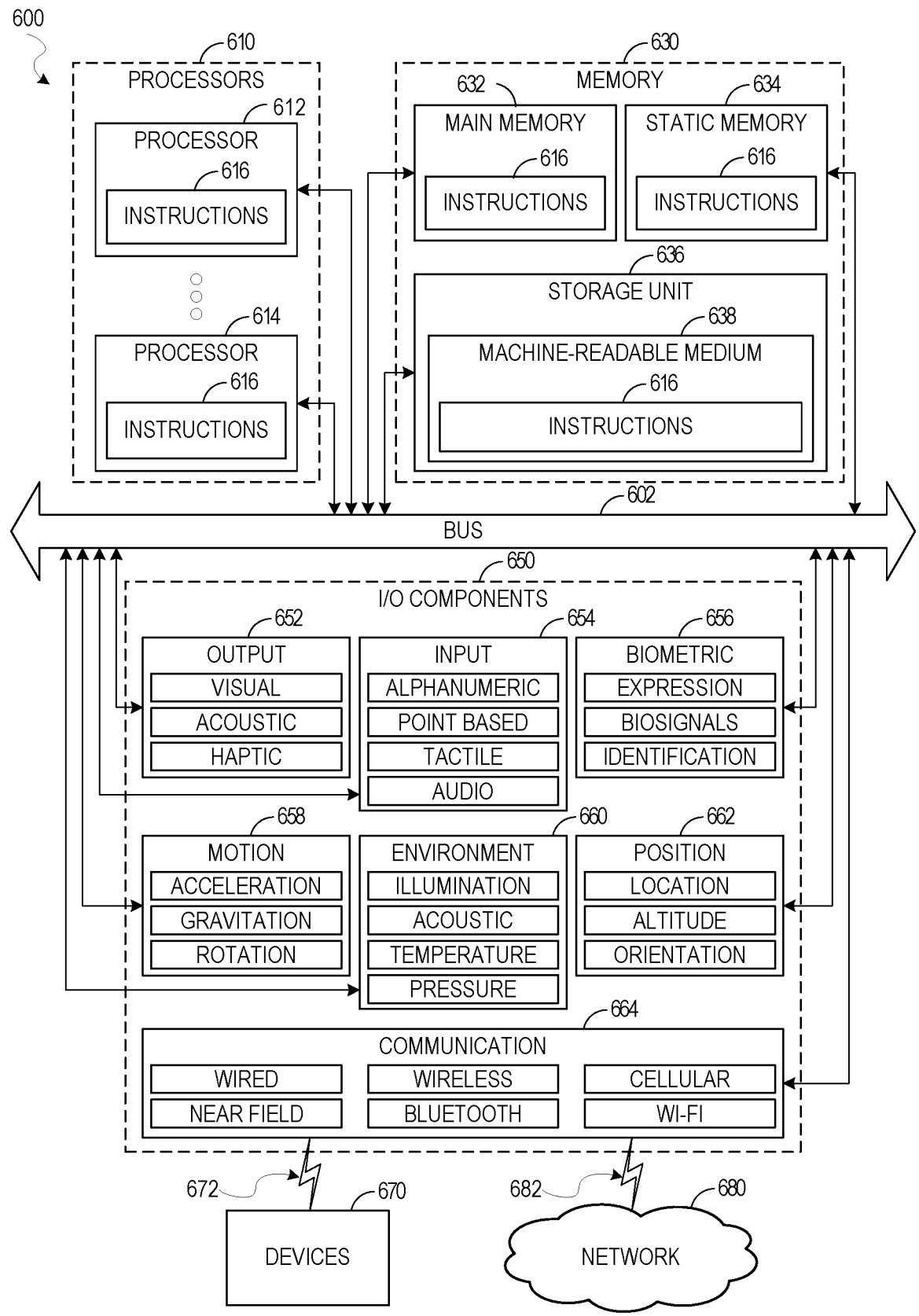
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   obtaining training data pairs, each training data pair being a pair of groupings of data having mutual exclusive relationships and identical to each other except for trigger pieces of data, each grouping of data having an ambiguous piece of data;
   feeding each of the training data pairs into a machine learning algorithm using a mutual exclusive loss function to train a commonsense machine learned model, the mutual exclusive loss function being a combination of a first and a second term, the first term being a measurement of mutual exclusivity of potential meanings of ambiguous pieces of data across pairs, the second term being a measurement of mutual exclusivity of potential meanings of ambiguous pieces of data within each pair; and
   feeding a grouping of text sentences into the commonsense machine learned model to output a prediction of a resolution of an ambiguous piece of data in the grouping.

2. The system of claim 1, wherein the operations further comprise:
   receiving the grouping of data having an ambiguous piece of data needing resolution from a plurality of pieces of data in the input grouping of data;
   replacing the ambiguous piece of data in the input grouping with a mask; and
   wherein the feeding includes feeding the masked input grouping into the commonsense machine learned model.

3. The system of claim 2, wherein the ambiguous piece of data is a pronoun and the plurality of pieces of data from which the pronoun needs to be resolved are nouns in the grouping of text sentences.

4. The system of claim 2, further including a chatbot, wherein the chatbot includes a model trained to take the input grouping of data and the prediction of the resolution of the ambiguous piece of data from the commonsense machine learned model and output a text output to a user responsive to the input grouping of data.

5. The system of claim 2, wherein the machine learning algorithm is a neural network.

6. The system of claim 5, wherein the neural network utilizes a Bidirectional Encoder Representations from Transformers (BERT) sentence encoder.

7. A method comprising:
   obtaining training data pairs, each training data pair being a pair of groupings of data having mutual exclusive relationships and identical to each other except for trigger pieces of data, each grouping of data having an ambiguous piece of data;
   feeding each of the training data pairs into a machine learning algorithm using a mutual exclusive loss function to train a commonsense machine learned model, the mutual exclusive loss function being a combination of a first and a second term, the first term being a measurement of mutual exclusivity of potential meanings of ambiguous pieces of data across pairs, the second term being a measurement of mutual exclusivity of potential meanings of ambiguous pieces of data within each pair; and
   feeding a grouping of text sentences into the commonsense machine learned model to output a prediction of a resolution of an ambiguous piece of data in the grouping.

8. The method of claim 7, further comprising:
   receiving the grouping of data having an ambiguous piece of data needing resolution from a plurality of pieces of data in the input grouping of data;
   replacing the ambiguous piece of data in the input grouping with a mask; and
   wherein the feeding includes feeding the masked input grouping into the commonsense machine learned model.

9. The method of claim 8, wherein the ambiguous piece of data is a pronoun and the plurality of pieces of data from which the pronoun needs to be resolved are nouns in the grouping of text sentences.

10. The method of claim 8, further including a chatbot, wherein the chatbot includes a model trained to take the input grouping of data and the prediction of the resolution of the ambiguous piece of data from the commonsense machine learned model and output a text output to a user responsive to the input grouping of data.

11. The method of claim 8, wherein the machine learning algorithm is a neural network.

12. The method of claim 11, wherein the neural network utilizes a Bidirectional Encoder Representations from Transformers (BERT) sentence encoder.

13. A non-transitory machine-readable medium storing instructions which, when executed by one or more processors, cause the one or more processors to perform operations comprising:

obtaining training data pairs, each training data pair being a pair of groupings of data having mutual exclusive relationships and identical to each other except for trigger pieces of data, each grouping of data having an ambiguous piece of data;

feeding each of the training data pairs into a machine learning algorithm using a mutual exclusive loss function to train a commonsense machine learned model, the mutual exclusive loss function being a combination of a first and a second term, the first term being a measurement of mutual exclusivity of potential meanings of ambiguous pieces of data across pairs, the second term being a measurement of mutual exclusivity of potential meanings of ambiguous pieces of data within each pair; and feeding a grouping of text sentences into the commonsense machine learned model to output a prediction of a resolution of an ambiguous piece of data in the grouping.

14. The non-transitory machine-readable medium of claim 13, wherein the operations further comprise:

receiving the grouping of data having an ambiguous piece of data needing resolution from a plurality of pieces of data in the input grouping of data;

replacing the ambiguous piece of data in the input grouping with a mask; and wherein the feeding includes feeding the masked input grouping into the commonsense machine learned model.

15. The non-transitory machine-readable medium of claim 14, wherein the ambiguous piece of data is a pronoun and the plurality of pieces of data from which the pronoun needs to be resolved are nouns in the grouping of text sentences.

16. The non-transitory machine-readable medium of claim 14, wherein the machine learning algorithm is a neural network.

17. The non-transitory machine-readable medium of claim 16, wherein the neural network utilizes a Bidirectional Encoder Representations from Transformers (BERT) sentence encoder.

* * * * *